United States Patent
Narayana Moorthy et al.

(10) Patent No.: US 11,740,345 B2
(45) Date of Patent: Aug. 29, 2023

(54) DITHERING FMCW RADAR PARAMETERS TO MITIGATE SPURIOUS SIGNALS

(71) Applicant: TEXAS INSTRUMENTS INCORPORATED, Dallas, TX (US)

(72) Inventors: Shankar Ram Narayana Moorthy, Bangalore (IN); Karthik Subburaj, Bangalore (IN); Anil KV Kumar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 355 days.

(21) Appl. No.: 16/294,764

(22) Filed: Mar. 6, 2019

(65) Prior Publication Data

US 2020/0284874 A1 Sep. 10, 2020

(51) Int. Cl.
| | |
|---|---|
| *G01S 13/58* | (2006.01) |
| *G01S 13/34* | (2006.01) |
| *G01S 7/35* | (2006.01) |
| *G01S 7/02* | (2006.01) |

(52) U.S. Cl.
CPC ............ *G01S 13/343* (2013.01); *G01S 7/023* (2013.01); *G01S 7/0234* (2021.05); *G01S 7/0235* (2021.05); *G01S 7/354* (2013.01); *G01S 13/584* (2013.01); *G01S 7/356* (2021.05)

(58) Field of Classification Search
CPC .... G01S 13/222; G01S 13/343; G01S 13/584; G01S 13/931; G01S 2007/356; G01S 7/023; G01S 7/354
See application file for complete search history.

(56) References Cited

U.S. PATENT DOCUMENTS

| | | | |
|---|---|---|---|
| 4,200,871 A | 4/1980 | Roeder et al. | |
| 2005/0179582 A1* | 8/2005 | Woodington | G01S 7/0232 |
| | | | 342/128 |
| 2009/0033538 A1 | 2/2009 | Winkler | |
| 2016/0327633 A1 | 11/2016 | Kumar Y.B. et al. | |
| 2017/0076497 A1 | 3/2017 | Inomata | |
| 2017/0363711 A1* | 12/2017 | Rao | H04L 27/103 |
| 2019/0113600 A1* | 4/2019 | Melzer | G01S 13/931 |
| 2019/0113602 A1* | 4/2019 | Matsumoto | G01S 13/584 |

FOREIGN PATENT DOCUMENTS

| | | |
|---|---|---|
| EP | 3373028 A1 | 12/2018 |
| WO | 2017031149 A1 | 2/2017 |

OTHER PUBLICATIONS

International Search Report for PCT/US2020/020860 dated Jun. 4, 2020.
Extended European Search Report in European Patent Application No. 20767433.4, dated Apr. 12, 2022, 8 pages.

* cited by examiner

*Primary Examiner* — Timothy A Brainard
(74) *Attorney, Agent, or Firm* — Michael T. Gabrik; Frank D. Cimino

(57) ABSTRACT

A method for a radar system includes transmitting, by a transmit channel of the radar system, a frame comprising first, second, and third chirps. Each chirp has a chirp start frequency, and the chirp start frequency of the transmitted chirps is dithered. The method also includes receiving, by a receive channel of the radar system, a frame of reflected chirps based on the transmitted frame, and generating a digital intermediate frequency (IF) signal.

18 Claims, 13 Drawing Sheets

DITHERING FMCW RADAR PARAMETERS TO MITIGATE SPURIOUS SIGNALS

SUMMARY

In accordance with at least one example of the disclosure, a method for a radar system includes transmitting, by a transmit channel of the radar system, a frame comprising first, second, and third chirps. Each chirp has a chirp start frequency, and the chirp start frequency of the transmitted chirps is dithered. The method also includes receiving, by a receive channel of the radar system, a frame of reflected chirps based on the transmitted frame, and generating a digital intermediate frequency (IF) signal.

In accordance with another example of the disclosure, a radar system includes a radar transceiver integrated circuit (IC) having a timing engine configured to generate one or more chirp control signals for controlling generation of chirps in the radar transceiver IC and a local oscillator coupled to the timing engine. The local oscillator is configured to receive the one or more chirp control signals, and generate a frame comprising first, second, and third chirps, each chirp having a chirp start frequency, wherein the frame further has an idle time between the chirps. The radar transceiver IC also includes a control module coupled to the timing engine. The control module is configured to dither the start frequencies of the chirps.

In accordance with yet another example of the disclosure, a method for a radar system includes dithering, by a control module of the radar system, a chirp start frequency of a plurality of transmitted chirps. The method also includes dithering, by the control module, a sampling window start time of reflected chirps generated by the transmitted chirps. Finally, the method includes dithering, by the control module, an idle time between the transmitted chirps.

BRIEF DESCRIPTION OF THE DRAWINGS

For a detailed description of various examples, reference will now be made to the accompanying drawings in which:

FIGS. 9a-1, 9a-2, and 9b show additional range-velocity plots viewed from multiple angles related to the example of FIG. 8 in accordance with various examples;

DETAILED DESCRIPTION

Figure 1:
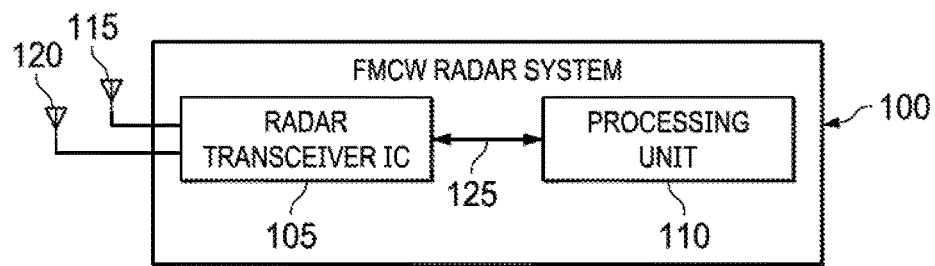
FIG. 1 shows a block diagram of a radar system in accordance with various examples.

Frequency-modulated continuous wave (FMCW) radar systems may be embedded in multiple usage applications, such as industrial applications, automotive applications, and the like. For example, an embedded FMCW radar system may be included in a vehicle to provide data for use in adaptive cruise control, collision warning, blind spot assist/warning, lane change assist, and parking assist. In other examples, embedded FMCW radar systems in industrial applications may provide data to aid in navigating autonomous equipment in a factory and in tracking movement.

FMCW radar systems may transmit a frame containing a series of frequency ramps referred to as chirps. These chirps may be reflected by a subject object back to the FMCW radar system. After receipt of a signal containing the reflected chirps, the FMCW radar system may down-convert, digitize, and process the received signal to determine characteristics of the subject object. These characteristics can include range, velocity, angle of arrival, etc., of the subject object when the subject object is in view of the FMCW radar system.

In at least some FMCW radar systems, multiple sequences of chirps (e.g., such as consecutive sequences of equally spaced chirps) are transmitted and reflections of these chirps received to generate radar signals. After each sequence of chirps, there may be some idle time (e.g., inter-frame idle time) to allow for processing the radar signals resulting from the reflected chirps. The acquisition time of a sequence of chirps, and the subsequent inter-frame idle time, together may form a radar frame. In at least one example, the reflected signal received by each antenna of the FMCW radar system is mixed with the transmitted signal to generate an intermediate frequency (IF) signal that is filtered and digitized. Signal processing may then be performed on the resulting digital IF signals (e.g., one per receiving antenna in the FMCW radar system) to extract any one or more of the range, velocity, and/or angle of potential objects in the view of the radar. For example, an IF signal frequency may be proportional to an object's distance, while changes to an IF signal phase across chirps may indicate an object's velocity.

A spurious signal (spur) is an unintended signal that can result from harmonics, intermodulation, frequency conversion, or electromagnetic interference (EMI). A spur is inserted in the transmitter path as a fixed-frequency signal, for example, by a coupling of a higher-order harmonic of a clock signal to a voltage-controlled oscillator (VCO) or a low-noise amplifier (LNA). However, when a reflected, fixed-frequency spur is mixed with the transmitted signal (a chirp) to generate an IF signal, the resultant IF signal frequency changes with time, which may be erroneously construed as multiple targets at different distances. Further, the IF signal corresponding to a spur from a clock signal, for example, undergoes a continuous phase shift between chirps, and thus may also be erroneously construed as a target having a constant velocity. In summary, while the IF component corresponding to an object may have a fixed frequency, indicating an object at a particular distance, the IF component of the spur signal may have a varying frequency, erroneously indicating objects at varying distances. Similarly, while the IF component corresponding to the object may have a fixed phase, indicating a stationary object, the IF component of the spur signal may have a phase that shifts constantly over time, erroneously indicating objects with constant velocities.

In examples of the present disclosure, one or more FMCW transmitting and/or receiving parameters are dithered to reduce or mitigate the impact of spurs on analyzing object(s) in view of the FMCW radar system. In some examples, the frequency at which the chirp begins (i.e., the frequency at which the frequency ramp begins) or a "chirp start frequency" is dithered from one chirp to the next, which effectively dithers the IF frequency of the spur component and dithers or breaks the consistency of the phase of the IF component of the spur signal. As a result, the IF component of the spur signal, which was already spread across multiple distance bins as explained above, is spread across velocity bins as well. Thus, the influence of the spur on subsequent object distance/velocity determinations is mitigated. However, the IF component corresponding to the object also leaks to different velocities, due to incoherence introduced by differences in the effective frequency at a sampling start time from chirp to chirp.

To address the foregoing, in addition to dithering the chirp start frequency, in some examples an analog-to-digital conversion (ADC) sampling window start time is also dithered from one chirp to the next. When the ADC sampling window of the receiver path starts at the same time relative to each chirp transmission, since the chirp frequency itself is being dithered, the effective start frequency for each ADC sampling window varies from chirp to chirp. To avoid signal incoherence, the ADC sampling window start time is dithered as well, such that the effective start frequency for the ADC sampling window is approximately the same from chirp to chirp. As a result, for objects that are stationary relative to the radar, the IF signal does not leak to other velocities. However, for objects that are moving relative to the radar, the IF signal erroneously leaks to other velocities due to a variable inter-chirp time introduced by the variable ADC sampling window start times.

To address the foregoing, in addition to dithering the chirp start frequency and the sampling window start time, in some examples an idle time between chirps (i.e., the time from ceasing transmission of one chirp to beginning transmission of a subsequent chirp) is also dithered. When the idle time between chirps is fixed, since the ADC sampling window start time is changing from chirp to chirp, the effective inter-chirp time (i.e., the time from beginning a first chirp sampling window to beginning a subsequent chirp sampling window) varies between chirps. In such a case, as a result of the variable effective inter-chirp times, the phase of the IF signal corresponding to any moving object becomes incoherent across chirps, rather than changing linearly, which is undesirable. In order to provide a more uniform inter-chirp time, the idle time between chirps is dithered as well. As a result, the erroneous leakage of the IF signal to other velocities is avoided for both stationary and moving objects, and the influence of the spur on subsequent object distance/velocity determinations remains mitigated as above. Further, in examples, the influence of synchronous spurs, asynchronous spurs, a set of multiple spurs, narrow-band noise, and other similar signals on subsequent object distance/velocity determinations is mitigated as well.

Figure 2:
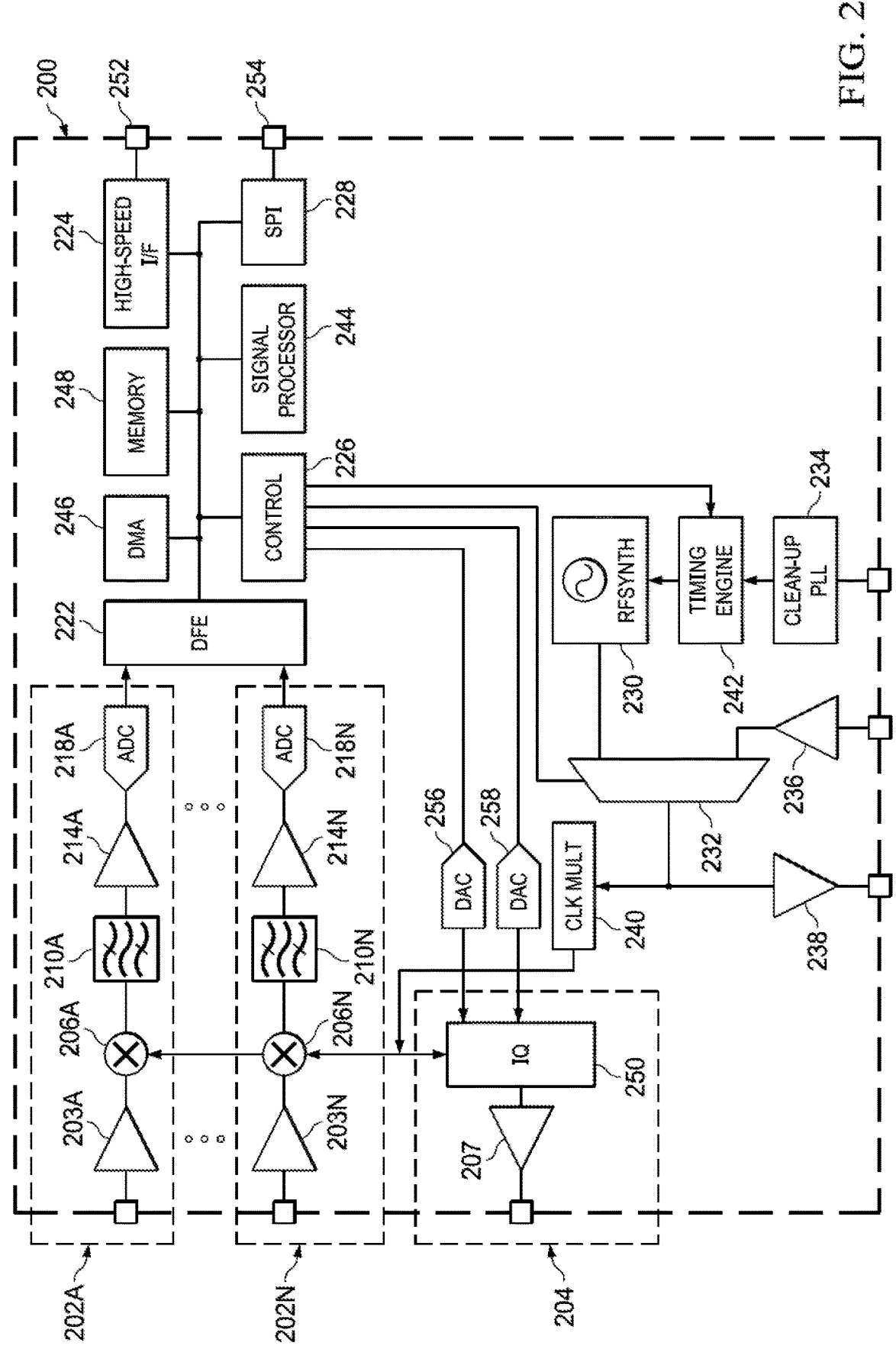
FIG. 2 shows a block diagram of a radar transceiver integrated circuit in accordance with various examples.

FIG. 1 shows a block diagram of an illustrative FMCW radar system 100. In at least one example, the FMCW radar system 100 includes a radar transceiver IC 105 and a processing unit 110. In some examples, the FMCW radar system 100 further includes a transmit antenna 115 and a receive antenna 120, while in other examples, the FMCW radar system 100 does not include, but is configured to couple to, the transmit antenna 115 and the receive antenna 120. An illustrative architecture of the radar transceiver IC 105 is illustrated in FIG. 2 and described below.

In at least one example, the radar transceiver IC 105 may be referred to as the front end of the FMCW radar system 100 and the processing unit 110 may be referred to as the back end of the FMCW radar system 100. In at least one example, the radar transceiver IC 105 and the processing unit 110 are implemented separately and may be configured to couple together, while in other examples, the radar transceiver IC 105 and the processing unit 110 are implemented together, for example, in a single chip package. In at least one example, the processing unit 110 is coupled to the radar transceiver IC 105 via an interface 125 that may facilitate any suitable communication method (e.g., serial interface or parallel interface) and is configured to receive data from and/or transmit data to the radar transceiver IC 105.

In at least one example, the interface 125 may be a high speed serial interface such as a low-voltage differential signaling (LVDS) interface. In another example, the interface 125 may be a lower speed interface such as a serial peripheral interface (SPI). In at least one example, the radar transceiver IC 105 includes functionality to generate one or more digital IF signals (alternatively referred to as de-chirped signals, beat signals, or raw radar signals) from reflected chirps received via the receive antenna 120. Further, in at least one example, the radar transceiver IC 105 includes functionality to perform at least a portion of the signal processing of radar signals (e.g., the reflected chirps and/or the digital IF signals) received in the radar transceiver IC 105, and to provide the results of this signal processing to the processing unit 110 via the interface 125. In at least one example, the radar transceiver IC 105 performs a range fast Fourier transform (FFT) for each received frame (e.g., each sequence of chirps of the frame) of the radar transceiver IC 105. In at least some examples, the radar transceiver IC 105 also performs a Doppler FFT for each received frame of the radar transceiver IC 105 (e.g., after performing, and on a result of, the range FFTs). The combination of the range FFTs and the Doppler FFTs may be referred to as a two-dimensional (2D) FFT (or 2D FFT processing).

In at least one example, the processing unit 110 includes functionality to process data received from the radar transceiver IC 105 to, for example, determine any one or more of a distance, velocity, and/or angle of any objects detected by the FMCW radar system 100. In some examples, the processing unit 110 may also, or alternatively, include functionality to perform post-processing of information about the detected objects, such as tracking objects, determining rate and direction of movement, etc. In at least one example, the processing unit 110 determines a distance and velocity of a detected object, for example, according to aspects of the present disclosure in which parameters of the FMCW radar system 100 are dithered. Examples of this disclosure may include dithering a chirp start frequency from one chirp to the next, dithering an ADC sampling window start time from one chirp to the next, and dithering an idle time between chirps. As a result of dithering various parameters of the FMCW radar system 100, IF signal leakage to other velocities is avoided for both stationary and moving objects, which mitigates the influence of spurious signals on object distance/velocity determinations. In various examples, the processing unit 110 includes any one or more suitable processors or combinations of processors as needed for processing data received from the radar transceiver IC 105 and or providing data to the radar transceiver IC 105. For example, the processing unit 110 may include any one or more of a digital signal processor (DSP), a microcontroller, a system-on-a-chip (SOC) combining both DSP and microcontroller processing, a field-programmable gate array (FPGA), or any combination of the foregoing.

Referring now to FIG. 2, a block diagram of an illustrative radar transceiver IC 200 is shown. In at least some examples, the radar transceiver IC 200 is suitable for implementation as the radar transceiver IC 105 of the FMCW radar system 100 of FIG. 1. In other examples, the radar transceiver IC 200 is suitable for implementation in other radar systems. In at least one example, the radar transceiver IC 200 includes one or more transmit channels 204 and one or more receive channels 202A-202N (where N is any positive integer). Each of the transmit channels 204 and the receive channels 202A-202N may be individually coupled to a transmit antenna or a receive antenna, respectively, such as a transmit antenna 115 or a receive antenna 120, as discussed above with respect to FIG. 1 and not shown in FIG. 2. Although illustrated for the sake of simplicity as including two receive channels 202A and 202N and one transmit channel 204, in various examples, the radar transceiver IC 200 may include any suitable number of receive channels 202N and/or any suitable number of transmit channels 204. Additionally, the number of receive channels 202N and the number of transmit channels 204 may be different numbers.

In at least one example, a transmit channel 204 includes a power amplifier (PA) 207 coupled between a transmit antenna (not shown) and an I/Q modulator 250 to amplify an output of the I/Q modulator 250 for transmission via the transmit antenna. In at least some examples, each additional transmit channel 204 may be substantially similar and may couple to its own respective transmit antenna (not shown) or to the same transmit antenna.

In at least one example, a first receive channel 202A includes a low-noise amplifier (LNA) 203A coupled between a receive antenna (not shown) and a mixer 206A to amplify a radio frequency (RF) signal (e.g., reflected chirps) received via the receive antenna prior to providing the amplified signal to the mixer 206A. In at least one example, the mixer 206A is coupled to the clock multiplier 240 and configured to receive a clock signal from the clock multiplier 240, for example, to mix with the received RF signal to generate an IF signal. In at least one example, a baseband bandpass filter 210A is coupled to the mixer 206A and configured to filter the IF signal, a variable gain amplifier (VGA) 214A is coupled to the baseband bandpass filter 210A and configured to amplify the filtered IF signal, and an analog-to-digital converter (ADC) 218A is coupled to the VGA 214A and configured to convert the analog IF signal to a digital IF signal. The baseband bandpass filter 210A, VGA 214A, and ADC 218A of a respective receive channel 202A may be collectively referred to as the analog baseband, the baseband chain, the complex baseband, or the baseband filter chain. Further, the baseband bandpass filter 210A and VGA 214A may be collectively referred to as an IF amplifier (IFA). In at least some examples, each additional receive channel 202N may be substantially similar to the first receive channel 202A and may couple to its own respective receive antenna (not shown) or to the same receive antenna. In at least one example, the ADC 218A is coupled to the digital front end (DFE) 222, for example, to provide the digital IF signals to the DFE 222. The DFE 222, which may also be referred to as the digital baseband, includes in at least one example, functionality to perform decimation filtering or other processing operations on the digital IF signals, for example, to reduce the data transfer rate of the digital IF signals. In various examples, the DFE 222 may also perform other operations on the digital IF signals such as direct current (DC) offset removal and/or compensation (e.g., digital compensation) of non-idealities in the receive channels 202A-202N such as inter-receiver gain imbalance non-ideality, inter-receiver phase imbalance non-ideality and the like. In at least one example, the DFE 222 is coupled to a signal processor 244 and configured to provide the output of the DFE 222 to the signal processor 244.

In at least one example, the signal processor 244 is configured to perform at least a portion of the signal processing on the digital IF signals resulting from a received radar frame and to transmit the results of this signal processing via terminal 252 and/or terminal 254. In at least one example, the signal processor 244 transmits the results of the signal processing to a processing unit (not shown), such as the processing unit 110 described above with respect to FIG. 1. In various examples, the results are provided from the signal processor 244 to the terminal 252 and/or the terminal 254 via the high speed interface 224 and/or the SPI 228, respectively. In at least one example, the signal processor 244 performs the range FFT on each sequence of chirps in the received radar frame to generate a range array. In at least one example, the signal processor 244 additionally performs the Doppler FFT on results of the range FFTs to generate a range-Doppler array.

The signal processor 244 may include any suitable processor or combination of processors. For example, the signal processor 244 may be a DSP, a microcontroller, a FFT engine, a DSP plus microcontroller processor, a FPGA, or an application specific integrated circuit (ASIC). In at least one example, the signal processor 244 is coupled to memory 248, for example, to store intermediate results of the portion of the signal processing performed on the digital IF signals in the memory 248 and/or to read instructions from the memory 248 for execution by the signal processor 244.

The memory 248, in at least one example, provides on-chip storage (e.g., a computer readable medium) which may be used, for example, to communicate data between the various components of the radar transceiver IC 200, to store software programs executed by processors on the radar transceiver IC 200, etc. The memory 248 may include any suitable combination of read-only memory (ROM) and/or random access memory (RAM) (e.g., such as static RAM). In at least one example, a direct memory access (DMA) component 246 is coupled to the memory 248 to perform data transfers from the memory 248 to the high speed interface 224 and/or the SPI 228.

In at least one example, the SPI 228 provides an interface for communication via terminal 254 between the radar transceiver IC 200 and another device (e.g., a processing unit such as the processing unit 110 of FIG. 1). For example, the radar transceiver IC 200 may receive control information, e.g., timing and frequencies of chirps, output power level, triggering of monitoring functions, etc., via the SPI 228. In at least one example, the radar transceiver IC 200 may transmit test data via the SPI 228, for example, to the processing unit 110.

In at least one example, the control module 226 includes functionality to control at least a portion of the operation of the radar transceiver IC 200. The control module 226 may include, for example, a microcontroller that executes firmware to control the operation of the radar transceiver IC 200. The control may be, for example, providing data parameters to other components of the radar transceiver IC 200 and/or providing control signals to other components of the radar transceiver IC 200.

In at least one example, the programmable timing engine 242 includes functionality to receive chirp parameter values from the control module 226 for a sequence of chirps in a radar frame and to generate chirp control signals that control the transmission and reception of the chirps in a frame based on the parameter values. In some examples, the chirp parameters are defined by the radar system architecture and may include, for example, a transmitter enable parameter for indicating which transmit channels to enable, a chirp frequency start value, a chirp frequency slope, an ADC sampling time, a ramp end time, a transmitter start time, etc. In examples of the present disclosure, the control module 226 and programmable timing engine 242 are configured to dither the chirp start frequency, the ADC sampling window start time (e.g., when to begin sampling data received from the ADC 218A), and/or the idle time between chirps. For example, when dithering the chirp start frequency, the control module 226 causes the programmable timing engine 242 to initiate a first chirp at a first chirp frequency start value and a second chirp at a second chirp frequency start value different than the first chirp frequency start value. In another example, when dithering the ADC sampling window start time, the control module 226 begins sampling data received from the ADC 218 at different times relative to a first chirp and a second chirp, such that the effective start frequency for the ADC sampling window is approximately the same from chirp to chirp, when taking into account the dithered chirp start frequency, explained above. In yet another example, when dithering the idle time between chirps, the control module 226 causes the programmable timing engine 242 to vary the idle time between chirps such that a first idle time between first and second chirps is different than a second idle time between second and third chirps, such that the effective inter-chirp time is approximately the same from chirp to chirp, when taking into account the dithered chirp start frequency and ADC sampling window start time, explained above.

In at least one example, the radio frequency synthesizer (RFSYNTH) 230 includes functionality to generate signals (e.g., chirps and/or chirp sequences) for transmission based on chirp control signals received from the programmable timing engine 242. In some examples, the RFSYNTH 230 includes a phase locked loop (PLL) with a voltage controlled oscillator (VCO). In at least one example, the RFSYNTH 230 may be referred to as a local oscillator (LO). The control module 226 and programmable timing engine 242 are configured to control the RFSYNTH 230 to dither the chirp start frequency, for example to generate a first chirp having a first chirp frequency start value and to generate a second chirp having a second chirp frequency start value different than the first chirp frequency start value.

In at least one example, the multiplexer 232 is coupled to the RFSYNTH 230 and the input buffer 236 and is configurable to select between signals received from the input buffer 236 from an external component (not shown) and signals generated by the RFSYNTH 230. In at least one example, the output buffer 238 is coupled to the multiplexer 232 and may, for example, provide signals selected by the multiplexer 232 to the input buffer of another radar transceiver IC (not shown). In at least one example, the multiplexer 232 is controlled by the control module 226 via a select signal.

In at least one example, the clock multiplier 240 increases a frequency of an output of the multiplexer 232 (e.g., such as the output of the RFSYNTH 230) to a frequency of operation of the mixer 206A. In at least one example, the clean-up PLL 234 is configured to increase the frequency of the signal of an external low frequency reference clock (not shown) received by the radar transceiver IC 200 to the frequency of the RFSYNTH 230 and to filter the reference clock phase noise out of the reference clock signal.

In at least one example, the I/Q modulator 250 is further coupled to a digital-to-analog converter (DAC) 356 and a DAC 358, each of which may be coupled to the control module 326.

Figure 3:
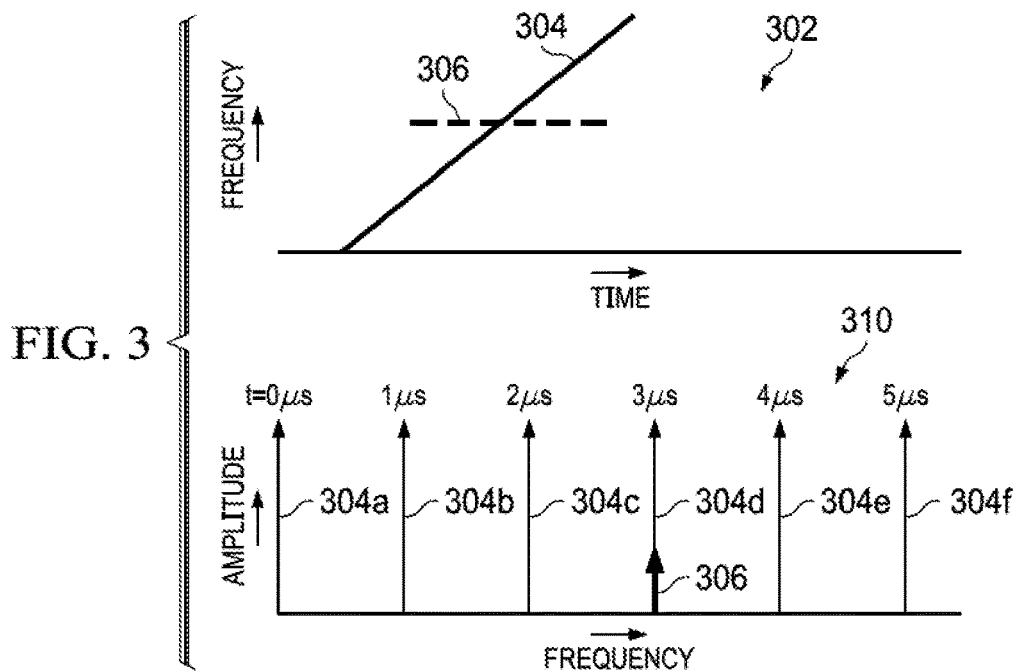
FIG. 3 shows frequency-versus-time and amplitude-versus-frequency plots for a chirp and a spurious signal (spur) in accordance with various examples.

FIG. 3 shows a frequency-versus-time plot 302 of a transmitted chirp 304 and a spur 306. A corresponding amplitude-versus-frequency plot 310 is also shown for the chirp 304 (shown at times a-f) and the spur 306. Referring to the plot 302, as explained above, the transmitted chirp 304 is a linear frequency ramp as a function of time. On the other hand, the spur 306 is a fixed-frequency component. The plot 310 reinforces this distinction, in which the spur 306 comprises a single frequency component, whereas the transmitted chirp frequency changes over time, denoted as 304$a$-$f$, which may correspond to, for example, the amplitude of the transmitted chirp 304 frequency at 0 us, 1 us, 2 us, 3 us, 4 us, and 5 us, respectively.

As one example, the chirp 304 may have a start frequency of 77 GHz and a slope of 10 MHz/us, while the spur 306 may have a fixed frequency of approximately 77.03 GHz. As an example of the mixer 206 generating an IF signal in the absence of the spur 306, assume that the chirp 304 is reflected off of an object in view of the FMCW radar system 100 and that the round trip is 0.2 us (e.g., an object distance of approximately 30 meters). The difference in the transmitted chirp 304 frequency (or transmitter path output frequency) and the reflected chirp 304 frequency (the receiver path input frequency) will be 2 MHz, or the chirp 304 slope of 10 MHz/us*the round trip time of 0.2 us. Thus, in the absence of a spur 306, an IF signal frequency component of 2 MHz corresponds to a 0.2 us round trip time, and an object distance of approximately 30 meters. However, as noted above, the presence of a fixed-frequency spur 306 results in multiple additional frequency components in the resulting IF signal erroneously appearing as objects at different distances.

Figure 4:
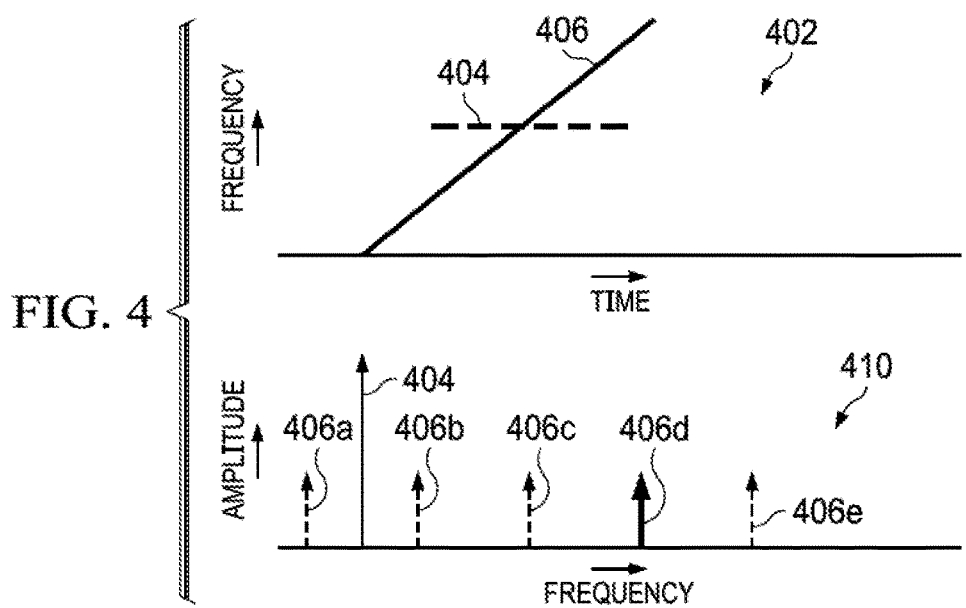
FIG. 4 shows frequency-versus-time and amplitude-versus-frequency plots for chirp and spur components of an intermediate frequency (IF) signal in accordance with various examples.

FIG. 4 demonstrates the distance-based issues introduced by the spur 306 of FIG. 3. FIG. 4 shows a frequency-versus-time plot 402 of an IF component 404 corresponding to the object (assuming a stationary object) and an IF component 406 corresponding to the spur. As explained above, for a stationary object, the IF component 404 frequency corresponding to the object is also fixed. On the other hand, the IF component 406 frequency corresponding to the spur increases linearly with time, since the transmitter path output frequency (i.e., the generated chirp) is a linear ramp, while the reflected spur component remains at a fixed frequency.

FIG. 4 also shows an amplitude-versus-frequency plot 410 for the IF component 404 corresponding to the object and the IF component 406 corresponding to the spur (shown at times a-e). The frequency of the IF component 404 corresponding to the object represents the distance of the stationary object (30 meters in the example above). However, the presence of IF components 406$a$-$e$ corresponding to the spur that vary with time results in erroneous determinations or identifications of objects at multiple distances. Further, although the IF components 406$a$-$e$ corresponding to the spur are shown as discrete, in practice these may actually be continuous as the transmitter path output frequency constantly, linearly increases with time while the receiver path input frequency (i.e., the fixed-frequency spur) remains constant. The IF component 406 corresponding to the spur also undergoes a constant phase shift, which as explained above, causes it to appear as an object moving at a constant velocity.

Figure 5:
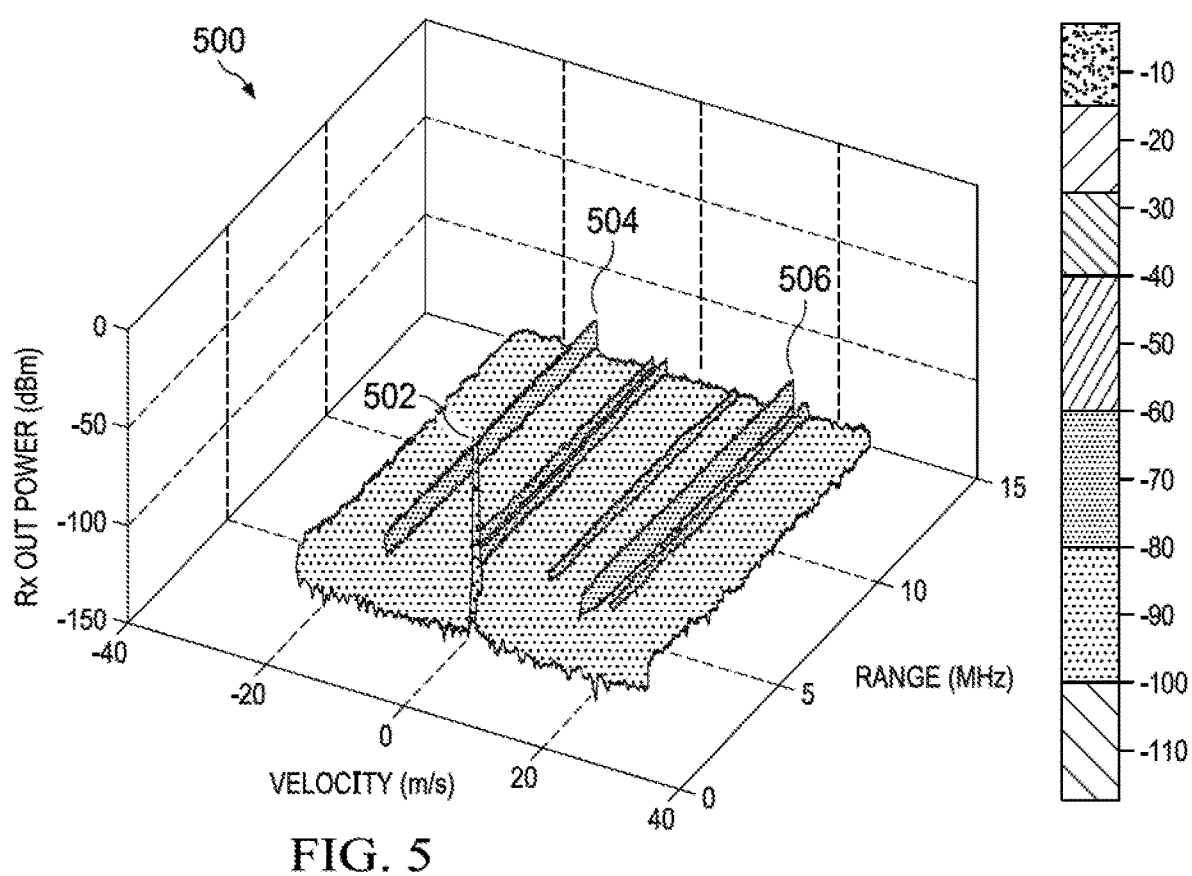
FIG. 5 shows a range-velocity plot of chirp and spur components of an IF signal in accordance with various examples.

FIG. 5 shows a range-velocity plot 500 as a function of receiver path output power (dB) that further indicates the erroneous distance-based and velocity-based issues introduced by the IF component 406 of FIG. 4 corresponding to the spur 306 of FIG. 3, discussed above. The range-velocity plot 500 includes an object peak 502 as a result of the IF component 404 corresponding to the object, having a velocity of 0 m/s at a fixed distance. The range-velocity plot 500 also includes spur ridges 504, 506 as a result of the IF component(s) 406 corresponding to spurs. As explained above, the IF component(s) 406 appear as objects at multiple distances, reflected by the ridges 504, 506 spanning multiple bins in the range axis. Further, the IF component(s) 406 appear as objects having a constant velocity, reflected by the position of the ridges 504, 506 along the velocity axis. These erroneous "objects" created by the spurs 306 and the IF components 406 are problematic in various radar applications.

Figure 6A:
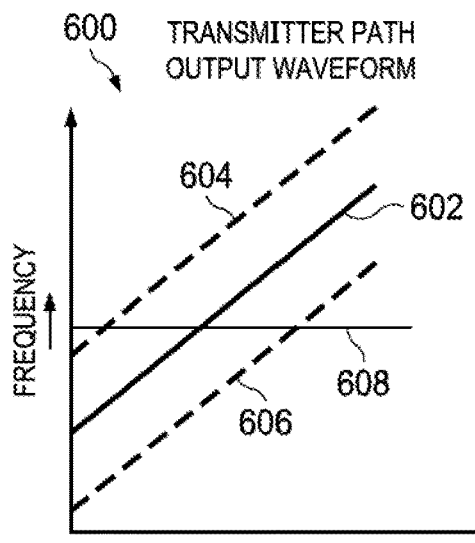
FIGS. 6a and 6b show transmitter path and receiver path output waveforms for chirps having a dithered chirp start frequency and a spur in accordance with various examples.

As explained above, the chirp start frequency is dithered from one chirp to the next, which effectively dithers the frequency of the IF component of the spur signal and dithers or breaks the consistency of the phase of the IF component of the spur signal. FIG. 6a shows a frequency-versus-time plot 600 including a first transmitted chirp 602, a second transmitted chirp 604, and a third transmitted chirp 606, in which the chirp start frequency is dithered from one chirp to the next. In addition, a spur 608, which is a fixed-frequency spur, is shown and explained above.

Figure 6B:
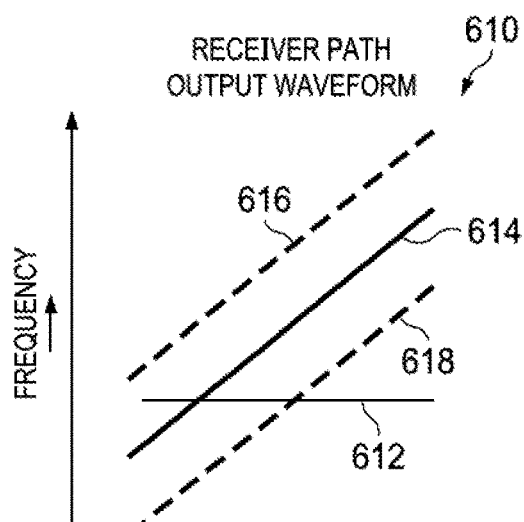

FIG. 6b shows a frequency-versus-time plot 610 of the receiver path IF signals that result from the dithered chirps 602, 604, 606 and the fixed-frequency spur 608 of FIG. 6a. In particular, assuming a static object, the reflected chirps will all have a constant difference from the transmitted chirps 602, 604, 606, and thus a IF component 612 corresponding to the chirps is also constant (e.g., 2 MHz in the example above). However, since the fixed-frequency spur 608 is being compared or mixed (e.g., by mixer 206) with dithered-frequency chirps 602, 604, 606, the resultant IF components 614, 616, 618, respectively, corresponding to the spur are also dithered. As a result of dithering the IF components 614, 616, 618, the consistency of the phase of the IF components 614, 616, 618 is also dithered, or broken. For example, dithering the chirp start frequency causes the starting phase of the signal in each range bin to be dithered across the chirps. Since the phase difference of the bin from one chirp to the next is not uniform, it no longer appears as a constant velocity signal, but rather a signal with varying velocity from chirp to chirp. Breaking the consistency of the phase of the IF components 614, 616, 618 corresponding to the spur spreads their impact across the velocity bins and thus mitigates the impact of ridges 504, 506 shown in FIG. 5 and described above.

Figure 7A:
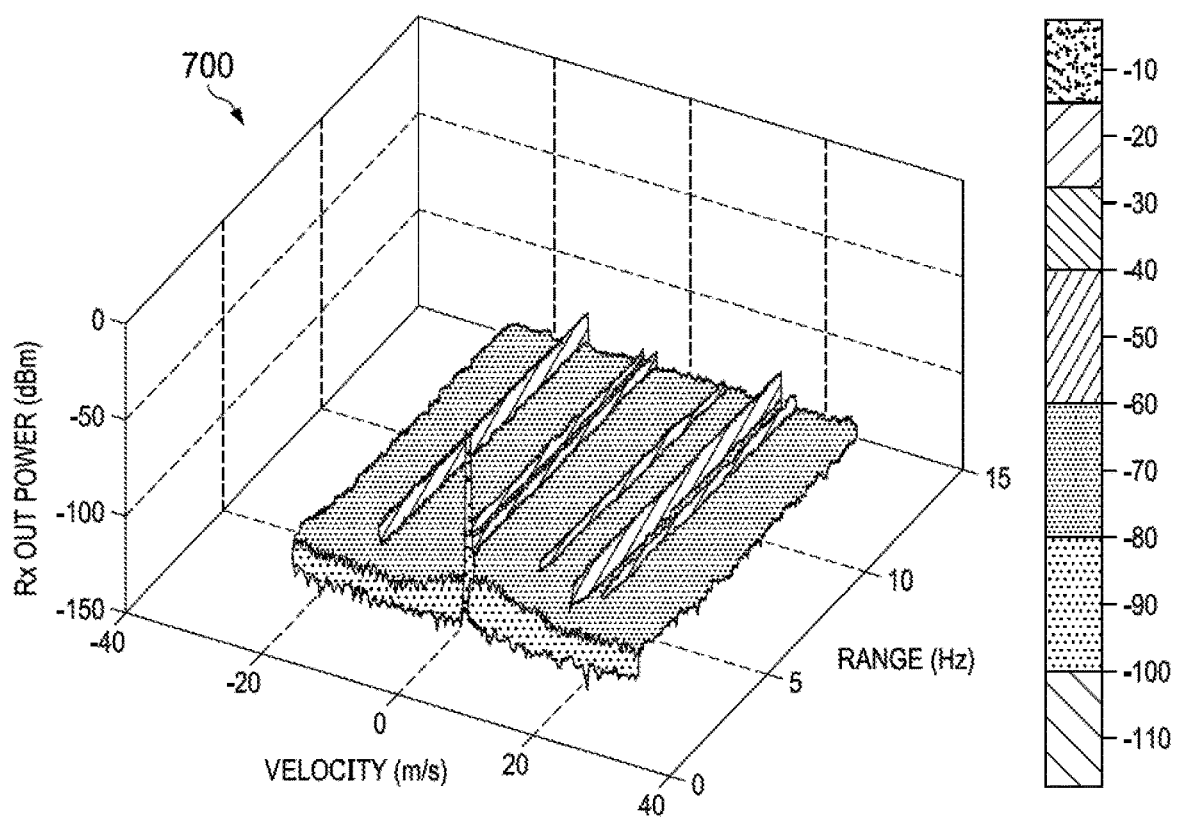
FIGS. 7a and 7b show additional range-velocity plots viewed from multiple angles related to the example of FIGS. 6a and 6b in accordance with various examples.
Figure 7A:
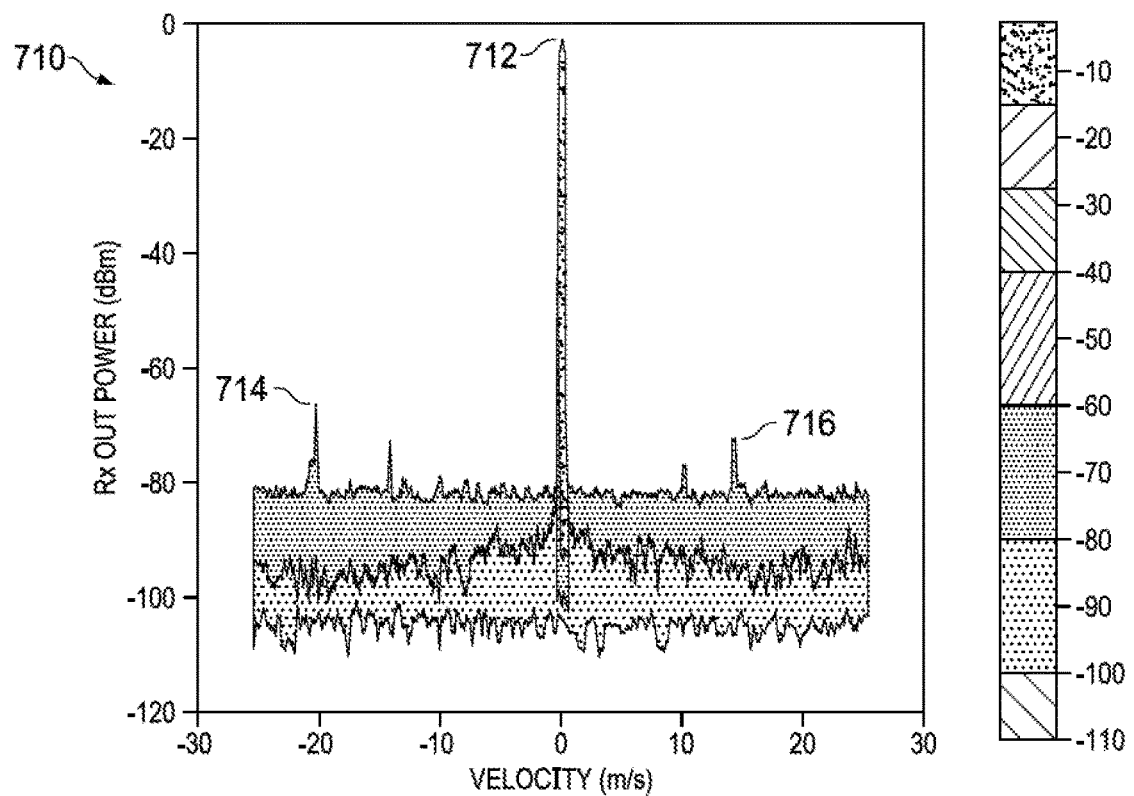
Figure 7B:
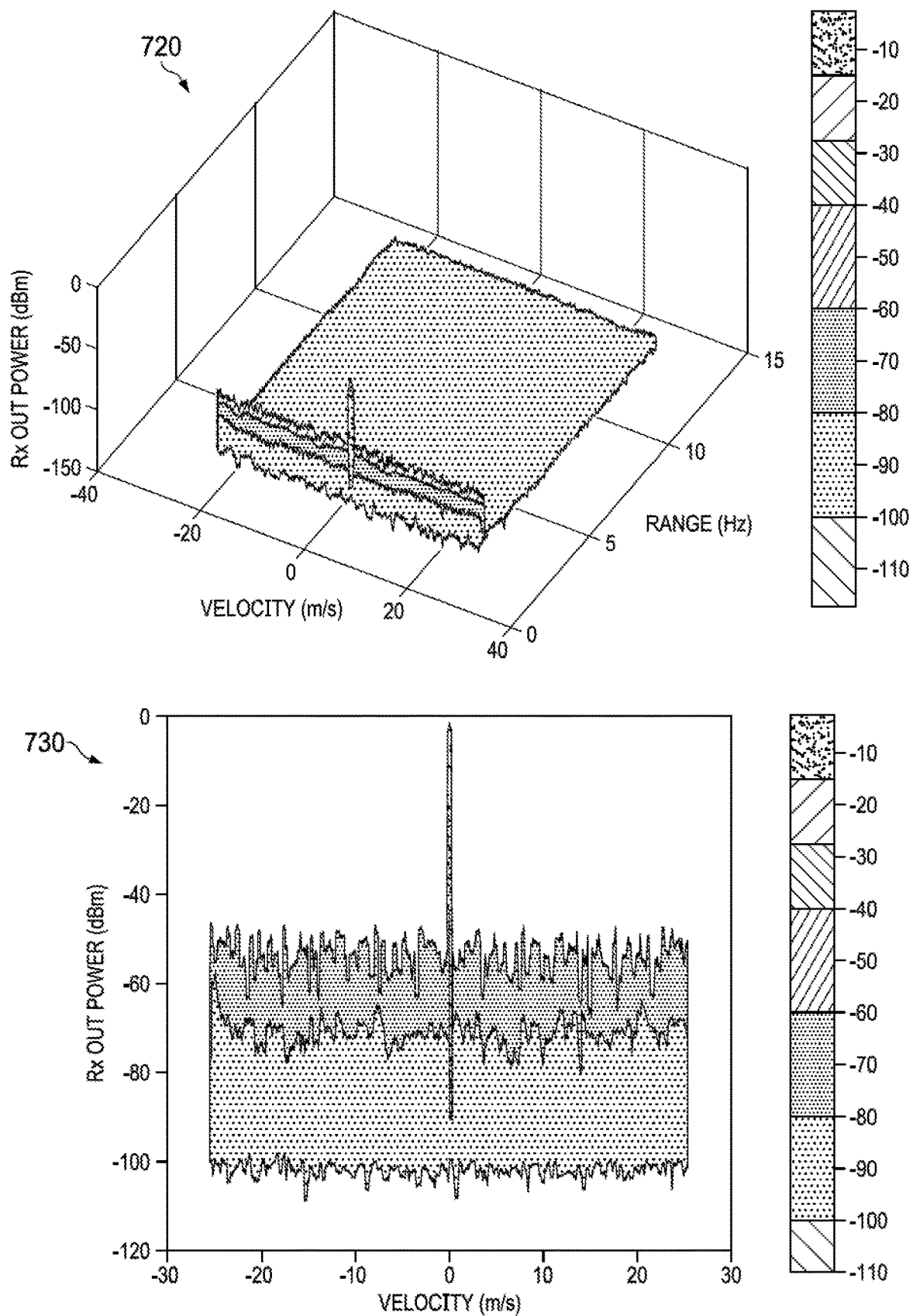

FIGS. 7a and 7b show a comparison of a range-velocity plot as a function of receiver path output power (dBm) before chirp start frequency dithering 700 and after chirp start frequency dithering 720. The range-velocity plot 700 is identical to plot 500 in FIG. 5 and is reproduced here for clarity. FIGS. 7a and 7b also shows a comparison of a velocity-versus-output power plot before chirp start frequency dithering 710 and after chirp start frequency dithering 730. In the velocity-versus-output power plot before chirp start frequency dithering 710, the peak 712 corresponds to the IF component corresponding to the chirp (and is similar to the peak 502 in FIG. 5, viewed along the velocity axis), while the peaks 714, 716 correspond to the IF components corresponding to the spur (and are similar to the ridges 504, 506 in FIG. 5, viewed along the velocity axis). As demonstrated in the range-velocity plot after chirp start frequency dithering 720, the ridges present in FIG. 5 (504, 506) have been mitigated, or spread across various velocity values. However, the velocity-versus-output power plot after chirp start frequency dithering 730 demonstrates that the IF component corresponding to the chirp has leaked to other velocity values (e.g., due to the impact of dithering on the phase consistency explained above), despite the fact that the object represented by the IF signal is stationary.

Figure 8:
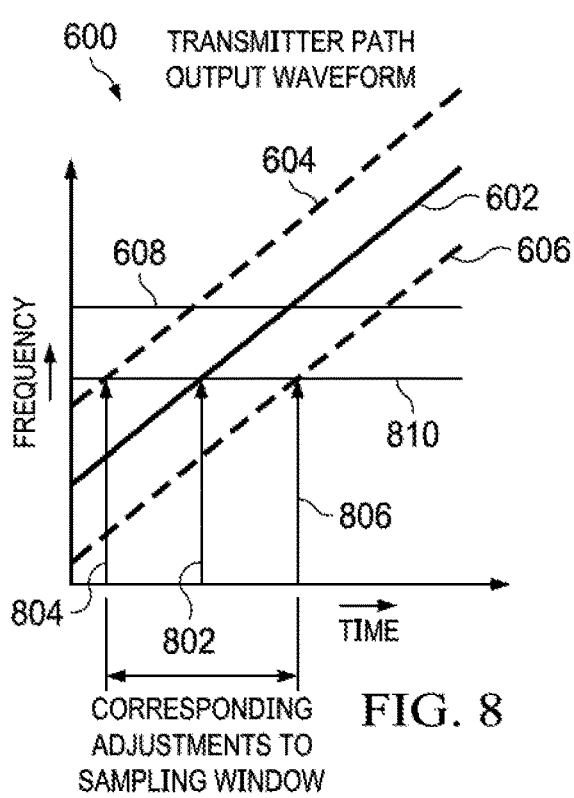
FIG. 8 shows a transmitter path output waveform for chirps having a dithered start frequency and a dithered sampling window start time in accordance with various examples.

As explained above, in addition to dithering the chirp start frequency, in some examples, an ADC sampling window start time is also dithered from one chirp to the next. FIG. 8 shows the frequency-versus-time plot 600 of FIG. 6a with different ADC sampling window start times 802, 804, 806 for chirps 602, 604, 606, respectively. In particular, the ADC sampling window start times 802, 804, 806 are selected relative to each chirp 602, 604, 606 such that the effective start frequency for each ADC sampling window is approximately the same, as demonstrated by frequency intercept line 810, which avoids signal incoherence. In examples, by dithering the ADC sampling window start time along with the chirp start frequency, phase coherency is maintained for the IF signal from chirp to chirp even though the chirp start frequency dithers.

Figures 1, 9A:
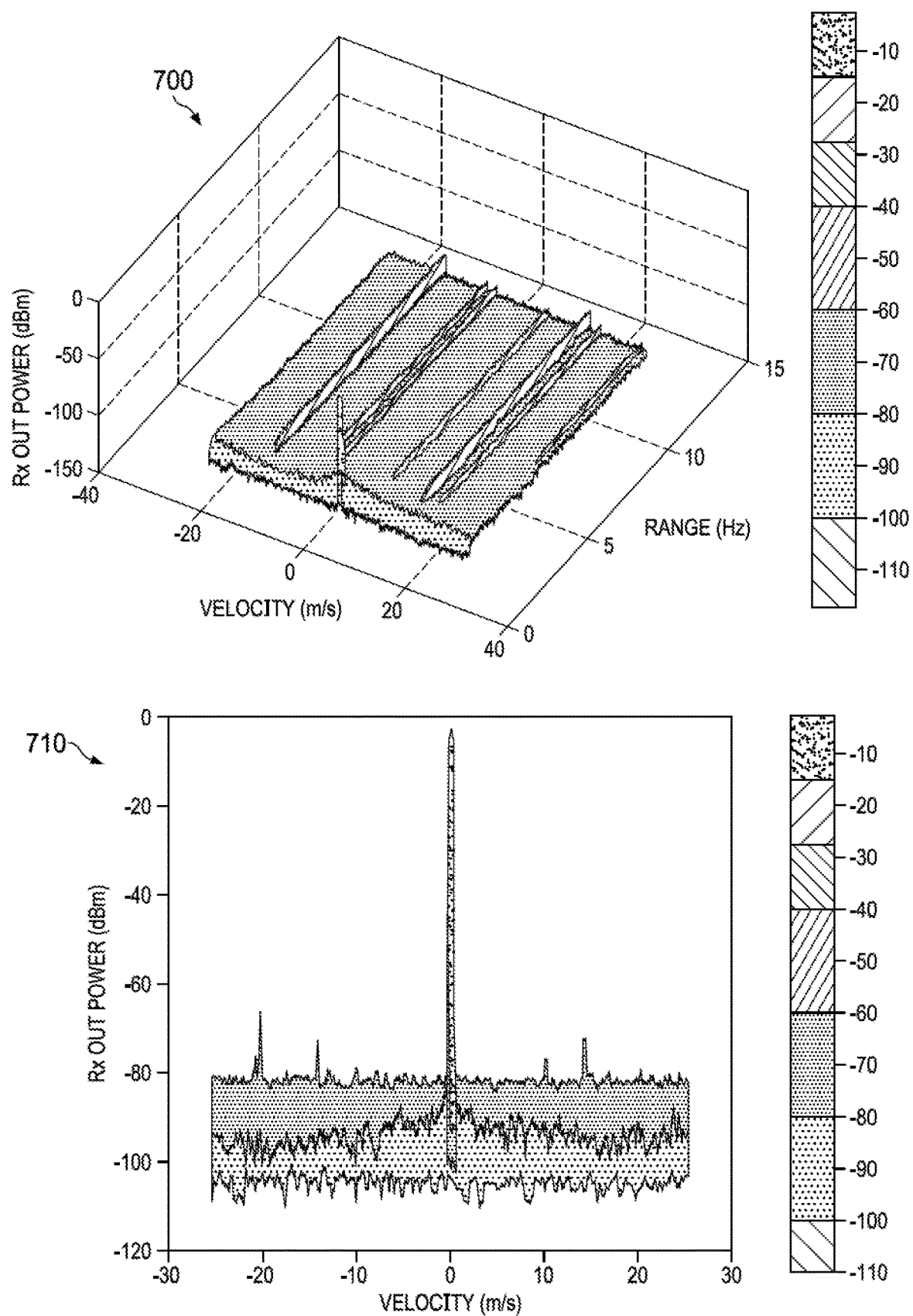
Figures 2, 9A:
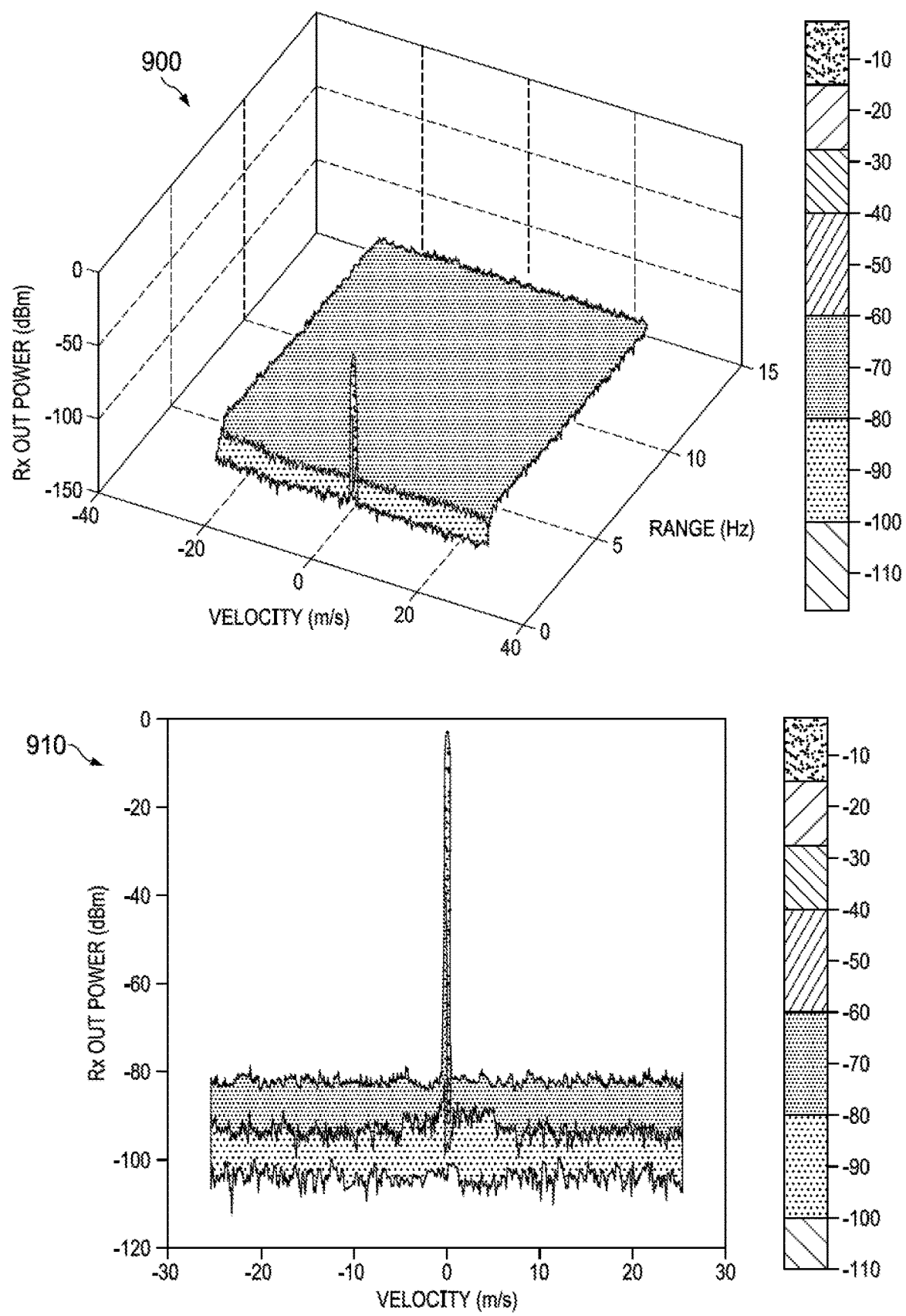

FIGS. 9a-1 and 9a-2 show a comparison of range-velocity plots 700, 900 as a function of receiver path output power (dBm) before (700) and after (900) chirp start frequency and sampling window start time dithering. FIGS. 9a-1 and 9a-2 also show a comparison of velocity-versus-output power plots 710, 910 before (710) and after (910) chirp start frequency and sampling window start time dithering. The range-velocity plot 700 and the velocity-versus-output power plot 710 are identical to those in FIGS. 7a and 7b. As demonstrated by the range-velocity plot 900 and the velocity-versus-output power plot 910, the influence of the spurs remains mitigated as before. Further, as best depicted in the velocity-versus-output power plot 910, for a stationary object, the chirp component no longer leaks to other velocity values and signal coherence is improved as a result of dithering the sampling start window time as described with respect to FIG. 8.

Figure 9B:
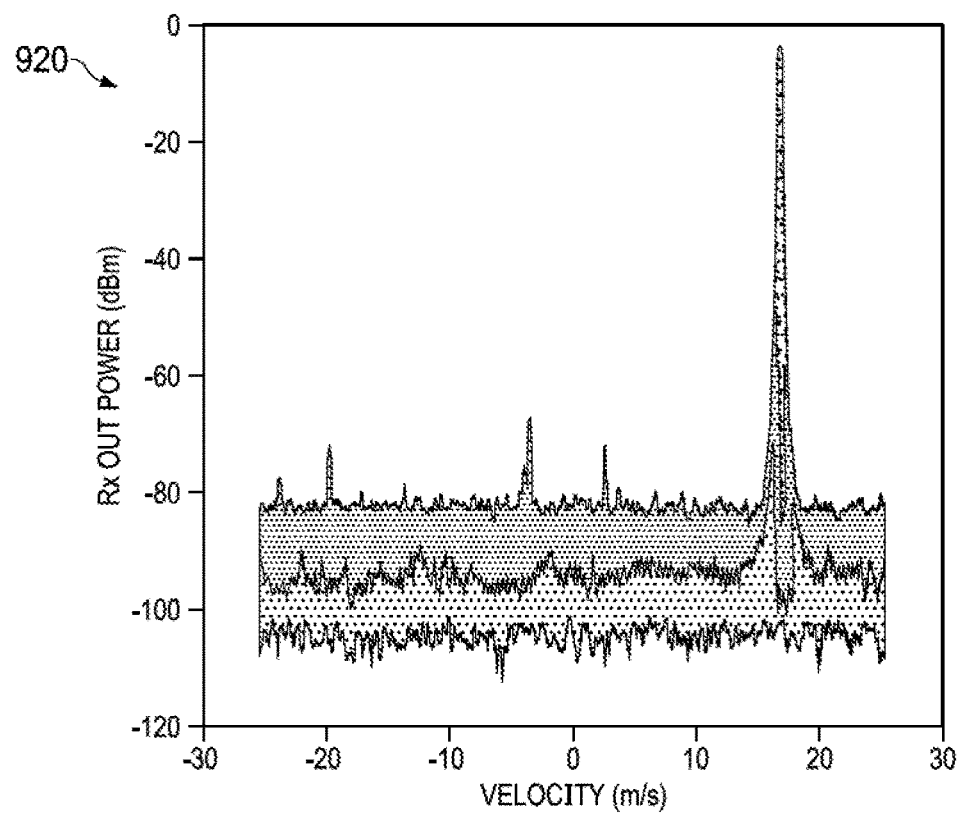
Figure 9B:
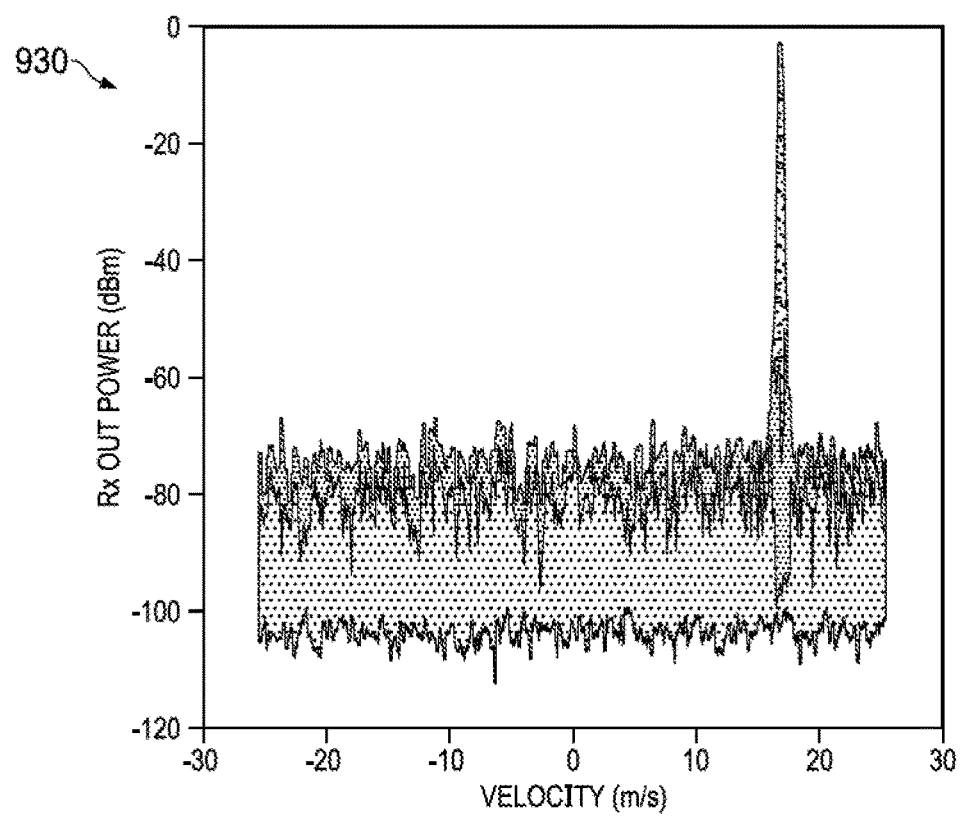

FIG. 9b shows a comparison of a velocity-versus-output power plot before and after chirp start frequency and sampling window start time dithering 920, 930, respectively, but in this case for a moving object. Dithering both the chirp start frequency and the sampling window start time addresses the leakage to other velocities for a stationary object. However, as can be seen by comparing plot 930 to plot 920, this double dithering approach still results in signal leakage to other velocities for a moving object. This signal leakage results from an unintentional modulation of the inter-chirp time, which will be explained more fully below.

Figure 10A:
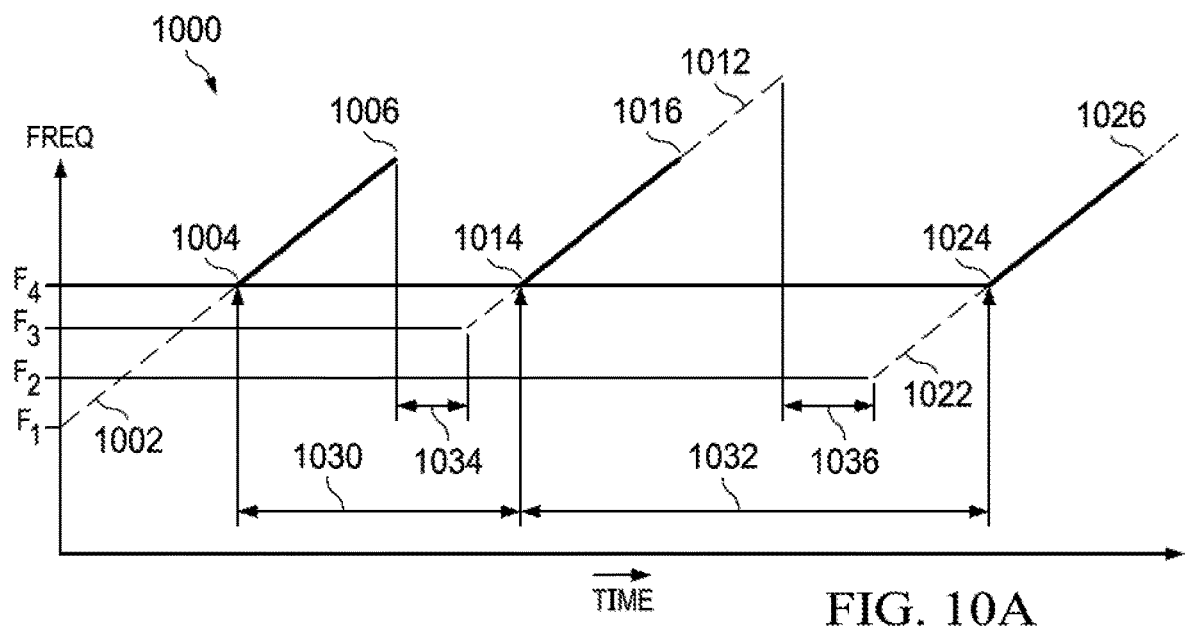
FIGS. 10a and 10b show transmitter path output waveforms for chirps before and after adding dithering of idle time between chirps in accordance with various examples.

FIG. 10a shows a frequency-versus-time plot of a frame 1000 (or a portion of a frame) including chirps 1002, 1012, 1022. In the frame 1000, the chirp start frequencies and the ADC sampling window start times are dithered, as explained above. For example, the chirp 1002 starts at a frequency F1, while the chirp 1012 starts at a frequency F3 and the chirp 1022 starts at a frequency F2.

Regarding the ADC sampling window start time, which is also dithered, the sampling window of the chirp 1002 begins at the point 1004, which is relatively far in time from the start of the chirp 1002, and ends at the point 1006. The sampling window of the chirp 1012 begins at the point 1014, which is relatively near in time to the start of the chirp 1012, and ends at the point 1016. The sampling window of the chirp 1022 begins at the point 1024, which is delayed from the start of the chirp 1022 approximately between the delays of the points 1004 and 1014 from the start of the first two chirps 1002, 1012, respectively. The sampling window of the chirp 1022 ends at the point 1026. As explained above, the sampling window start times at points 1004, 1014, 1024 are selected such that the frequency at those times of the respective chirps 1002, 1012, 1022 are approximately equal (e.g., at a frequency F4).

In FIG. 10a, an idle time between chirps 1002, 1012, 1022 is approximately equal. For example, an idle time 1034 between the end of the chirp 1002 and the beginning of the chirp 1012 is approximately equal to an idle time 1036 between the end of the chirp 1012 and the beginning of the chirp 1022. As a result, an inter-chirp time, or the time from the sampling window start time of one chirp to the sampling window start time of the following chirp, varies between chirps. For example, an inter-chirp time 1030 between the sampling window start time at point 1004 of the chirp 1002 and the sampling window start time at point 1014 of the chirp 1012 is less than an inter-chirp time 1032 between the sampling window start time at point 1014 of the chirp 1012 and the sampling window start time at point 1024 of the chirp 1022. This unintentional modulation of the inter-chirp time 1030, 1032 results in the signal leakage to other velocities for a moving object, as explained above. For example, a constant-velocity moving object moves non-uniform distances from one chirp sampling to the next, and thus the phase of an IF signal for the constant-velocity moving object will also vary from one chirp sampling to next, causing leakage in the velocity axis.

Figure 10B:
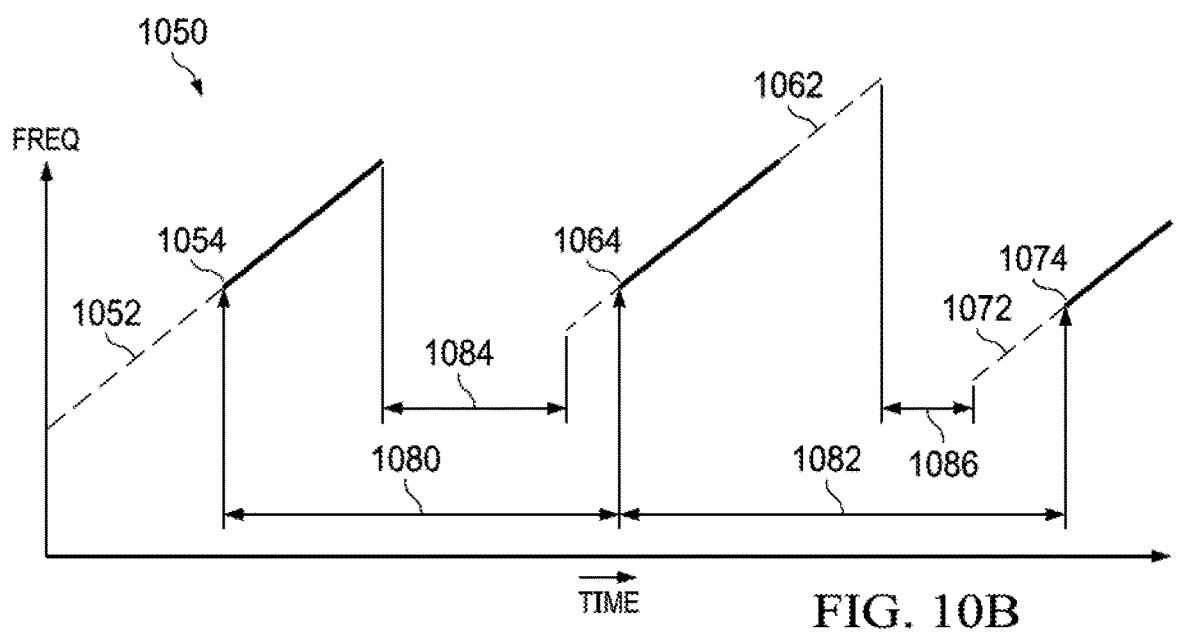

FIG. 10b shows a frequency-versus-time plot of a frame 1050 (or a portion of a frame) in which the idle time between chirps is dithered as well. The frame 1050 includes chirps 1052, 1062, 1072. In the frame 1050, the chirp start frequencies and the ADC sampling window start times are also dithered, as explained above with respect to FIG. 10a. In addition, in frame 1050, the idle time between chirps is dithered and thus an idle time 1084 between the chirps 1052, 1062 is longer in duration than an idle time 1086 between the chirps 1062, 1072. As a result, despite the dithering of the chirp start frequencies and the ADC sampling window start times, which by themselves lead to unintentional modulation of inter-chirp times, an inter-chirp time 1080 between the sampling window start time 1054 of the chirp 1052 and the sampling window start time 1064 of the chirp 1062 is approximately equal to an inter-chirp time 1082 between the sampling window start time 1064 of the chirp 1062 and the sampling window start time 1074 of the chirp 1072.

Figure 11A:
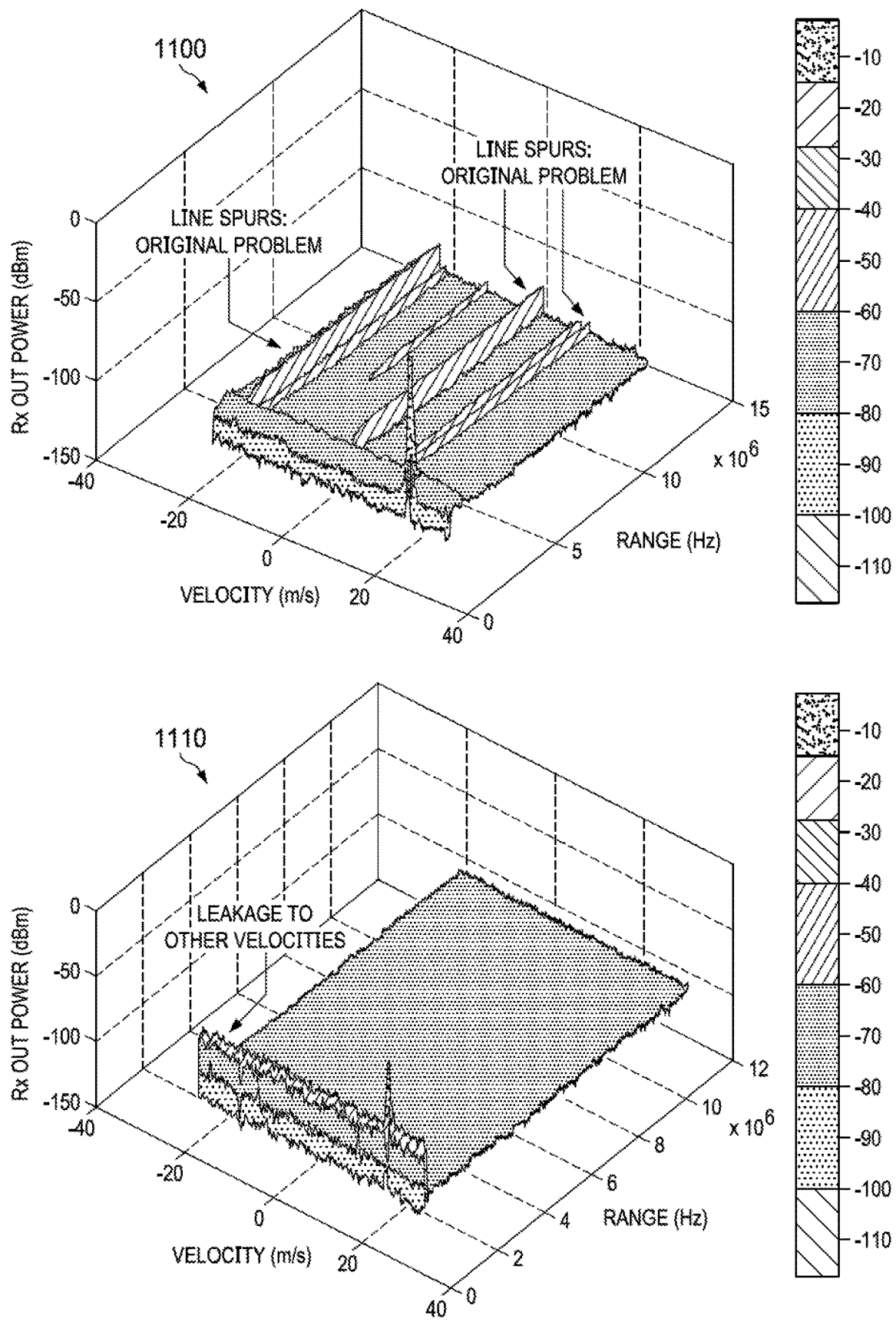
FIGS. 11a and 11b show additional range-velocity plots related to the examples of FIGS. 6a, 6b, 8, and 10b in accordance with various examples.
Figure 11B:
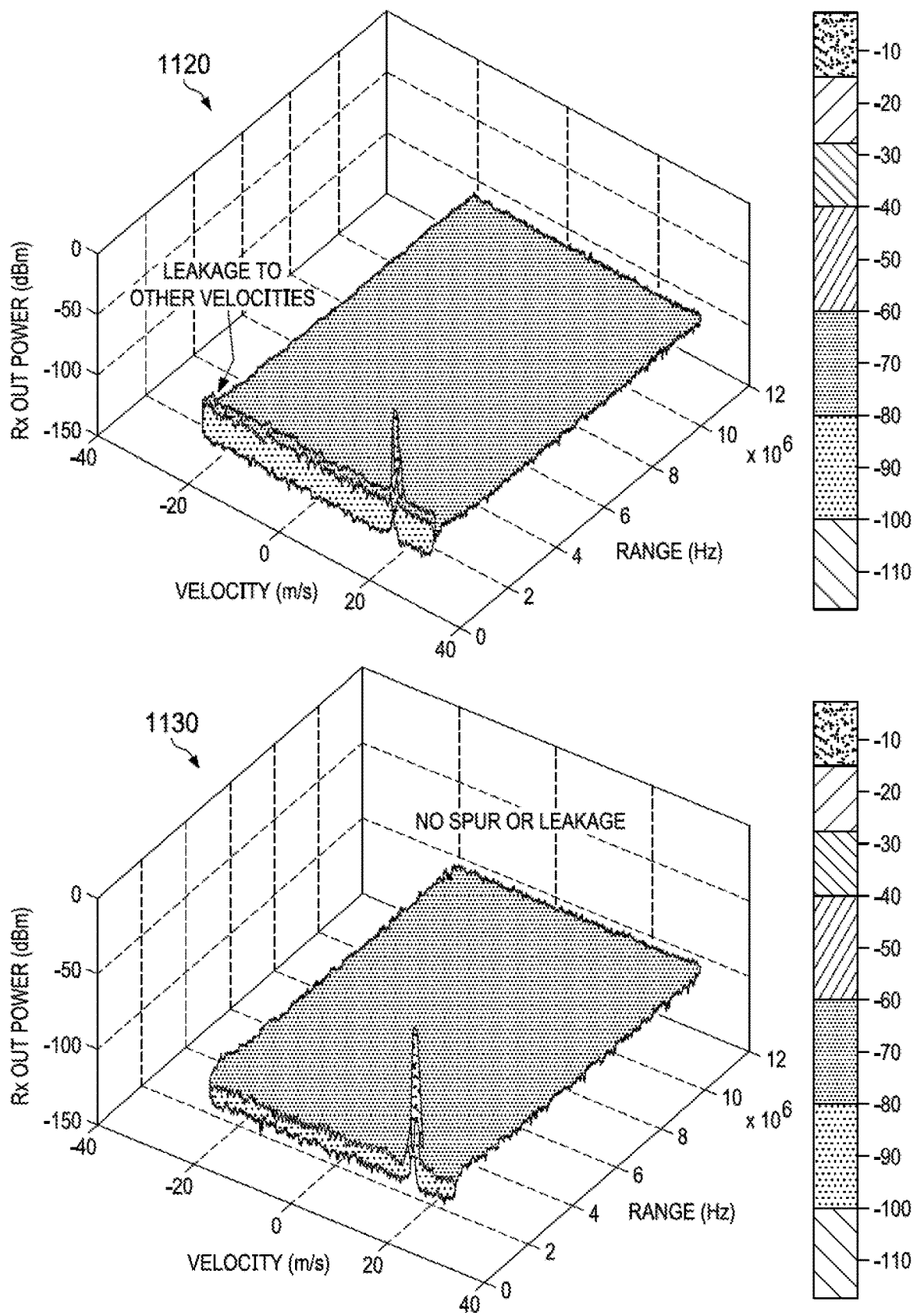

FIGS. 11a and 11b show a comparison of range-velocity plots 1100, 1110, 1120, 1130 as a function of receiver path output power (dBm) with no dithering (1100); dithering the chirp start frequency (1110, single dithering example); dithering the chirp start frequency and the ADC sampling window start times (1120, double dithering example); and dithering the chirp start frequency, the ADC sampling window start times, and the idle time between chirps (1130, triple dithering example). As explained above with respect to FIG. 5, in the no dithering plot 1100, spurs appear as ridges spanning multiple range bins at a particular, constant velocity. Further, as described with respect to FIGS. 7a and 7b, in the single dithering plot 1110, spurs are spread across velocity bins, mitigating their impact on the range-velocity plot. However, the IF component corresponding to the object leaks to other velocities. In the exemplary double dithering plot 1120 (shown here for a moving object), the IF component corresponding to the object still leaks to other velocities, although this is not the case with a stationary object. Finally, in the exemplary triple dithering plot 1130, the spurs remain mitigated, while the IF component corresponding to the object no longer leaks to other velocities. In short, when triple dithering is applied, the IF component corresponding to the object is readily identifiable in the plot 1130, without influence from spurs.

Figure 12:
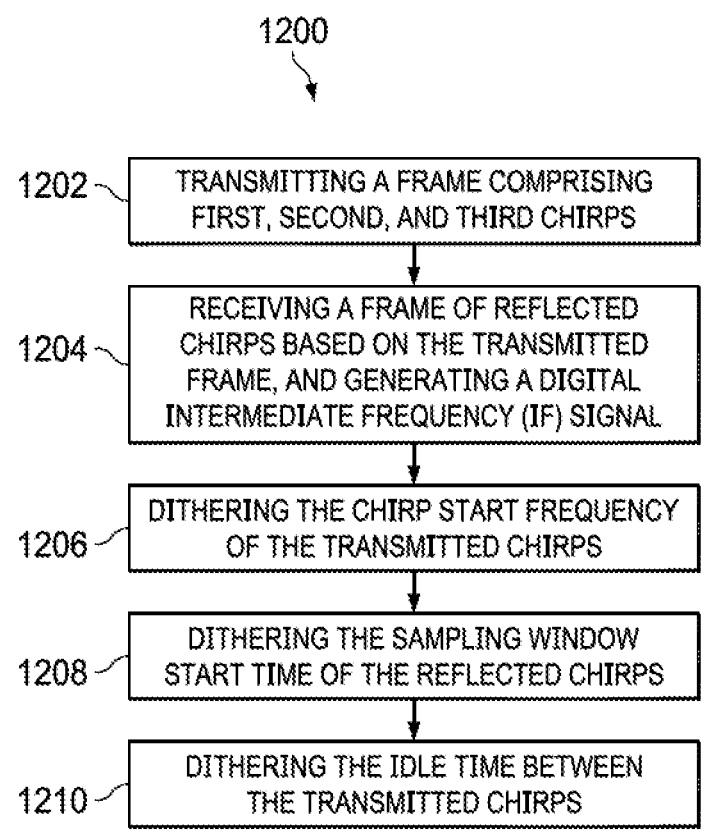
FIG. 12 shows a flow chart of a method in accordance with various examples.

FIG. 12 shows a flow chart of an example method 1200 for mitigating spurious signals in an FMCW radar system 100 including a radar transceiver IC 200 as described above in FIGS. 1 and 2. The method 1200 begins in block 1202 with transmitting a frame comprising first, second, and third chirps. For example, the transmit channel 204 transmits the first, second, and third chirps based on input from the control module 226, the timing engine 242, and the RFSYNTH 230. As explained above, each chirp has a chirp start frequency and the frame includes an idle time between the chirps. The method 1200 continues in block 1204 with receiving a frame of reflected chirps based on the transmitted frame, and generating a digital intermediate frequency (IF) signal. For example, the receive channel 202 receives the reflected chirps and the mixer 206 mixes a clock signal from the clock multiplier 240 with the received RF signal corresponding to the reflected chirps generates the IF signal. Each first, second, and third reflected chirp has a sampling window start time.

The method 1200 continues in block 1206 with dithering the chirp start frequency of the transmitted chirps. For example, the control module 226 causes the programmable timing engine 242 to initiate a first chirp at a first chirp frequency start value and a second chirp at a second chirp frequency start value different than the first chirp frequency start value. In some examples, the method 1200 continues further in block 1208 with dithering the sampling window start time of the reflected chirps. For example, the control module 226 begins sampling data received from the ADC 218 at different times relative to a first chirp and a second chirp, such that the effective start frequency for the ADC sampling window is approximately the same from chirp to chirp, when taking into account the dithered chirp start frequency. In another example, the method 1200 continues in block 1210 with dithering the idle time between the transmitted chirps. For example, the control module 226 causes the programmable timing engine 242 to vary the idle time between chirps such that a first idle time between first and second chirps is different than a second idle time between second and third chirps, such that the effective inter-chirp time is approximately the same from chirp to chirp, when taking into account the dithered chirp start frequency and ADC sampling window start time.

Although the above discussion generally relates to synchronous spurs, dithering radar parameters as described may also mitigate similar influences caused by asynchronous spurs, a set of multiple spurs, narrow-band noise, and other similar signals on subsequent object distance/velocity determinations. In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method for a radar system, the method comprising:
   transmitting, by a transmit channel of the radar system, a frame comprising first, second, and third chirps, each chirp having a chirp start frequency, wherein the chirp start frequency of the transmitted chirps is dithered;
   receiving, by a receive channel of the radar system, a frame of reflected chirps based on the transmitted frame;
   generating a digital intermediate frequency (IF) signal; and
   dithering sampling window start times of the reflected chirps such that a time duration between sampling window start times of a first reflected chirp and a second reflected chirp is within ten percent of a time duration between sampling window start times of the second reflected chirp and a third reflected chirp.

2. The method of claim 1, wherein the frame of transmitted chirps further has an idle time between the transmitted chirps, the method further comprising dithering the idle time between the transmitted chirps.

3. The method of claim 2, further comprising:
   performing a range fast Fourier transform (FFT) on the digital IF signal to generate a range array.

4. The method of claim 3, further comprising:
   performing a two-dimensional FFT on the digital IF signal to generate a range-Doppler array.

5. The method of claim 1, wherein at each sampling window start time, a frequency of the first reflected chirp is approximately equal to a frequency of the second reflected chirp, and to a frequency of the third reflected chirp.

6. The method of claim 1, wherein the frame of transmitted chirps further has:

a first idle time between an end of the first transmitted chirp and a beginning of the transmitted second chirp; and
a second idle time between an end of the second transmitted chirp and a beginning of the third transmitted chirp,
wherein the method further comprises setting the second idle time to be approximately equal to the first idle time.

7. The method of claim 1, wherein generating the digital IF signal comprises:
   mixing a clock signal with the frame of reflected chirps to produce an analog IF signal;
   filtering the analog IF signal to produce a filtered signal; and
   digitizing, by an analog-to-digital converter (ADC), the filtered signal to produce the digital IF signal.

8. The method of claim 7, wherein the frame of transmitted chirps further has an idle time between the transmitted chirps,
   wherein at each sampling window start time, a frequency of the first reflected chirp is approximately equal to a frequency of the second reflected chirp, and to a frequency of the third reflected chirp, and
   wherein the method further comprises dithering the idle time between the transmitted chirps.

9. A radar system, comprising:
   a radar transceiver integrated circuit (IC), comprising:
      a timing engine configured to generate one or more chirp control signals for controlling generation of chirps in the radar transceiver IC;
      a local oscillator coupled to the timing engine, the local oscillator configured to:
         receive the one or more chirp control signals; and
         transmit a frame comprising first, second, and third chirps, each transmitted chirp having a chirp start frequency; and
      a controller coupled to the timing engine, the controller configured to dither the start frequencies of the chirps and sampling window start times of an analog-to-digital converter (ADC) for reflected chirps received by the radar transceiver IC,
      wherein the controller is configured to dither the sampling window start times such that a time duration between sampling window start times of a first reflected chirp and a second reflected chirp is within ten percent of a time duration between sampling window start times of the second reflected chirp and a third reflected chirp,
      wherein at each sampling window start time, a frequency of the first reflected chirp is within ten percent of a frequency of the second reflected chirp, and of a frequency of the third reflected chirp.

10. The radar system of claim 9,
    wherein the frame further has an idle time between the transmitted chirps, and
    wherein the controller is further configured to dither the idle time between the transmitted chirps.

11. The radar system of claim 10, further comprising a processor coupled to the radar transceiver IC and configured to perform a range fast Fourier transform (FFT) on a digital intermediate frequency (IF) signal received from the ADC to generate a range array.

12. The radar system of claim 11, wherein the processor is further configured to perform a two-dimensional FFT on the IF signal to generate a range-Doppler array.

13. The radar system of claim 9, wherein the frame of transmitted chirps further has:
- a first idle time between an end of the first chirp and a beginning of the second chirp; and
- a second idle time between an end of the second chirp and a beginning of the third chirp,
- wherein the controller is further configured to set the second idle time to be approximately equal to the first idle time.

14. The radar system of claim 9, wherein the radar transceiver IC is further configured to:
- mix a clock signal with the frame of reflected chirps to produce an analog IF signal;
- filter the analog IF signal to produce a filtered signal;
- cause the ADC to digitize the filtered signal to produce the digital IF signal; and
- perform a two-dimensional Fast Fourier Transform on the digital IF signal to generate a range-Doppler array.

15. The radar system of claim 14,
- wherein the frame of transmitted chirps further has an idle time between the transmitted chirps,
- wherein the controller is further configured to dither the idle time between the transmitted chirps, and
- wherein at each sampling window start time, a frequency of the first reflected chirp is approximately equal to a frequency of the second reflected chirp, and to a frequency of the third reflected chirp.

16. A method for a radar system, comprising:
- dithering, by a controller of the radar system, a chirp start frequency of a plurality of transmitted chirps; and
- dithering, by the controller and for each reflected chirp in a plurality of reflected chirps corresponding to the plurality of transmitted chirps, a sampling window start time such that a time duration between sampling window start times of a first reflected chirp and a second reflected chirp is within ten percent of a time duration between sampling window start times of the second reflected chirp and a third reflected chirp,
- wherein, at each sampling window start time, frequencies of the first second, and third reflected chirps are within 10 percent of each other.

17. The method of claim 16, further comprising:
- generating a digital intermediate frequency (IF) signal based on the plurality of reflected chirps; and
- performing a range fast Fourier transform (FFT) on the IF signal to generate a range array.

18. The method of claim 17, further comprising:
- performing a two-dimensional FFT on the IF signal to generate a range-Doppler array.

\* \* \* \* \*